United States Patent
Yamada

(10) Patent No.: US 10,802,614 B2
(45) Date of Patent: Oct. 13, 2020

(54) ELECTRONIC CIRCUIT OF ELECTRONIC PEN AND ELECTRONIC PEN

(71) Applicant: Wacom Co., Ltd., Saitama (JP)

(72) Inventor: Susumu Yamada, Gunma (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/273,842

(22) Filed: Feb. 12, 2019

(65) Prior Publication Data
US 2019/0250726 A1    Aug. 15, 2019

(30) Foreign Application Priority Data

Feb. 14, 2018  (JP) ................................. 2018-023619
Sep. 21, 2018  (JP) ................................. 2018-176727

(51) Int. Cl.
*G06F 3/0354*  (2013.01)
*H01F 27/00*  (2006.01)
*G06F 1/04*  (2006.01)
*G06F 3/041*  (2006.01)

(52) U.S. Cl.
CPC ............ *G06F 3/03545* (2013.01); *G06F 1/04* (2013.01); *G06F 3/041* (2013.01); *H01F 27/004* (2013.01)

(58) Field of Classification Search
None
See application file for complete search history.

(56) References Cited

U.S. PATENT DOCUMENTS 10,564,740 B2 *   2/2020  Attarian ................. G06F 3/046
2008/0149402 A1 * 6/2008  Vos ..................... G06F 3/03545
                                                          178/19.01

FOREIGN PATENT DOCUMENTS

| JP | 2002-244806 A | 8/2002 |
| JP | 2011-186803 A | 9/2011 |
| JP | 2013-161307 A | 8/2013 |
| JP | 6008393 B2    | 10/2016 |

OTHER PUBLICATIONS

Extended European Search Report, dated Jun. 19, 2019, for European Application No. 19157189.2-1231, 5 pages.

* cited by examiner

*Primary Examiner* — Kenneth B Lee, Jr.
(74) *Attorney, Agent, or Firm* — Seed IP Law Group LLP

(57) ABSTRACT

An electronic circuit of an electronic pen includes an integrated circuit, and a resonant circuit that is formed of a parallel circuit of a coil and a first capacitor and is externally connected to the integrated circuit. The integrated circuit includes a variable-capacitance circuit which, in operation, adjusts a frequency of the resonant circuit, and has a connection pin connecting the variable-capacitance circuit to outside of the integrated circuit. A first end of the parallel circuit is grounded and a second end of the parallel circuit is connected to a first end of a second capacitor externally connected to the integrated circuit. A second end of the second capacitor is connected to the connection pin of the integrated circuit and is connected to a diode which, in operation, clamps a potential of the second end of the second capacitor to a predetermined value.

13 Claims, 5 Drawing Sheets

ELECTRONIC CIRCUIT OF ELECTRONIC PEN AND ELECTRONIC PEN

BACKGROUND

Technical Field

This disclosure relates to an electronic circuit suitable to be used for an electronic pen of the electromagnetic induction system for example. Furthermore, this disclosure relates to an electronic pen including this electronic circuit.

Background Art

A coordinate input device of the electromagnetic induction system is composed of a position detecting device including a position detecting sensor obtained by disposing a large number of loop coils in an X-axis direction and a Y-axis direction that are coordinate axes and an electronic pen having a resonant circuit composed of a coil wound around a magnetic core and a capacitor as disclosed in Patent Document 1 (Japanese Patent Laid-open No. 2002-244806) for example.

The position detecting device supplies a transmission signal with a predetermined frequency to the loop coils of the position detecting sensor and the loop coils transmit the transmission signal to the electronic pen as electromagnetic energy. The resonant circuit of the electronic pen is configured to have a resonant frequency f0 according to the frequency of the transmission signal and stores the electromagnetic energy based on an electromagnetic induction effect between the resonant circuit and the loop coils of the position detecting sensor. Then, the electronic pen returns the electromagnetic energy stored in the resonant circuit to the loop coils of the position detecting sensor of the position detecting device.

The loop coils of the position detecting sensor detect the electromagnetic energy from this electronic pen. The position detecting device detects coordinate values of the X-axis direction and the Y-axis direction on the sensor, indicated by the electronic pen, based on the position of the loop coil that has supplied the transmission signal and the position of the loop coil that has detected the electromagnetic energy from the resonant circuit of the electronic pen.

Furthermore, the electronic pen includes a writing pressure detector for detecting the pressure (writing pressure) applied to the pen tip and transmits information on the writing pressure detected by this writing pressure detector to the position detecting device through the power detecting sensor. As one of methods for transmitting this information on the writing pressure to the position detecting device, a method in which the information is transmitted in the format of a digital signal is known. It is general that the electronic pen is equipped with an integrated circuit (IC) as a circuit for this purpose (for example refer to Patent Document 2 (Japanese Patent No. 6008393)).

FIG. 6 is a diagram depicting one example of an electronic circuit 200 included in this kind of electronic pen of the electromagnetic induction system. The electronic circuit 200 of the electronic pen of this example includes a resonant circuit 203 configured by connecting a coil 201 wound around a magnetic core and a capacitor 202 in parallel and an IC 230. The IC 230 has functions of a control circuit.

In this example, for the resonant circuit 203, a variable-capacitance capacitor (trimmer capacitor) 204 for adjustment of the resonant frequency f0 is connected in parallel to the coil 201 and the capacitor 202. An adjuster adjusts the capacitance of this variable-capacitance capacitor 204 and thereby the resonant frequency f0 of the resonant circuit 203 is adjusted to be optimized.

In this example, a rectification circuit 205 that rectifies an induced current flowing in the resonant circuit 203 due to electromagnetic induction from the external and generates a supply voltage Vcc of the IC 230 is disposed. The rectification circuit 205 includes capacitors 206 and 209 and diodes 207 and 208.

One end side of the parallel circuit including the coil 201 and the capacitor 202 of the resonant circuit 203 and the variable-capacitance capacitor 204 is grounded and the other end side is connected to one end side of the capacitor 206. The other end side of the capacitor 206 is connected to a connecting node between the cathode of the diode 207 and the anode of the diode 208. The anode side of the diode 207 is grounded. Furthermore, the cathode of the diode 208 is grounded through the capacitor 209. A connecting node between this cathode of the diode 208 and the capacitor 209 serves as an output terminal of the rectification circuit 205 and the supply voltage Vcc is output. This output terminal of the rectification circuit 205 is connected to a connection pin 230*a* of the IC 230.

Furthermore, in the electronic circuit 200 of FIG. 6, a connecting node P0 between the other end side of the resonant circuit 203 and the one end of the capacitor 206 is connected to a connection pin 230*b* connected to a clock generating circuit formed inside the IC 230 through a capacitor 210. Furthermore, the connecting node P0 is grounded through a series circuit of a capacitor 211 and a switch circuit 212. Moreover, the switch circuit 212 is connected to a connection pin 230*c* of the IC 230 from which a switching control signal SW is output. The switch circuit 212 is on- and off-controlled by the control signal SW from the IC 230 to carry out on- and off-control of the connection of the capacitor 211 to the resonant circuit 203. When the capacitor 211 is not connected to the resonant circuit 203, the resonant circuit 203 resonates with the above-described resonant frequency f0 and a predetermined phase. When the capacitor 211 is connected, the resonant frequency is set to a frequency different from f0 or the resonant circuit 203 is set to a phase different from the predetermined phase.

Furthermore, in this example of FIG. 6, a unit that detects the writing pressure as change in the capacitance is used as the writing pressure detector and a connection pin 230*d* of the IC 230 is grounded through a variable-capacitance capacitor 220 formed of this writing pressure detector. Furthermore, a resistor 221 is connected in parallel to the variable-capacitance capacitor 220.

In detection of a writing pressure value detected by the writing pressure detector, the IC 230 sets the variable-capacitance capacitor 220 to the fully-charged state and then stops the charge to make the state in which the variable-capacitance capacitor 220 is discharged through the resistor 221. Then, the IC 230 measures the time necessary to discharge the variable-capacitance capacitor 220 to a predetermined charging potential with the capacitance of the variable-capacitance capacitor 220 at the time and detects the capacitance of the variable-capacitance capacitor 220 from the length of the time to acquire information on the writing pressure according to the detected capacitance. In this example, the IC 230 acquires the information on the writing pressure as digital information of plural bits and transmits the information to the position detecting device.

In the electronic circuit 200 of the electronic pen, a signal sent from the position detecting sensor is received by the resonant circuit 203 based on electromagnetic induction and is rectified by the rectification circuit 205 to generate the supply voltage Vcc to drive the IC 230. Thereby, the IC 230 is driven. In the IC 230, the received signal is taken in through the capacitor 210 and a clock signal is generated. Then, in the IC 230, the control signal SW is generated based on the generated clock signal and the generated control signal SW is supplied to the switch circuit 212.

The control signal SW is set to a low level in a position detection period and the switch circuit 212 is set to the off-state, which makes the state in which the capacitor 211 is not connected to the resonant circuit 203. Due to this, in the position detection period, in the electronic circuit 200, the resonant circuit 203 transmits the signal received from the position detecting sensor to the position detecting sensor with unchanged frequency and phase.

Furthermore, in an additional information period, the control signal SW becomes a signal corresponding to the digital information of the detected writing pressure value. For example, the control signal SW becomes the low level when the bit of the digital information of the writing pressure value is "1," and becomes the high level when the bit is "0." Due to this, in the additional information period, a signal modulated according to the digital information is transmitted to the position detecting sensor.

In the position detecting device, in the position detection period, the position indicated by the electronic pen is detected based on which position in the position detecting sensor the loop coil that has received the signal from the electronic pen exists at. Furthermore, in the position detecting device, in the additional information period, the writing pressure value in the electronic pen is detected by demodulating the modulated signal.

As described above, the electronic pen of the electromagnetic induction system includes the resonant circuit 203 and transmits and receives signals by being electromagnetically coupled to the position detecting sensor of the position detecting device by this resonant circuit 203. In this case, the resonant frequency of the resonant circuit 203 needs to be set to the optimum state that matches the frequency of the alternating current (AC) signal transmitted from the position detecting sensor. Therefore, in the electronic circuit 200 of the electronic pen of the related art, the resonant frequency of the resonant circuit 203 is optimized by connecting the trimmer capacitor 204 to the resonant circuit 203 and adjusting this trimmer capacitor 204.

Therefore, in the electronic circuit 200 of the electronic pen of the related art, there is a problem that the adjustment of the trimmer capacitor 204 is troublesome.

Not only the electronic pens but electronic circuits including a resonant circuit have the same problem.

BRIEF SUMMARY

In view of the above problem, this disclosure intends to allow adjustment of the resonant frequency of a resonant circuit of an electronic circuit without using the trimmer capacitor 204.

In order to solve the above-described problem, an electronic circuit including an integrated circuit (IC) and a resonant circuit that is formed of a parallel circuit of a coil and a first capacitor and is externally connected to the IC is provided. The IC includes a variable-capacitance capacitor which, in operation, adjusts a frequency of the resonant circuit and has a connection pin connecting the variable-capacitance capacitor to the outside of the integrated circuit. One end of the parallel circuit is grounded and the other end of the parallel circuit is connected to one end of a second capacitor externally connected to the IC. The other end of the second capacitor is connected to the connection pin of the IC and is connected to a diode which, in operation, clamps the potential of the other end of the second capacitor to a predetermined value.

In the electronic circuit with the above-described configuration, the variable-capacitance capacitor which, in operation, adjusts the frequency of the resonant circuit is included in the IC and thus a trimmer capacitor does not need to be connected to the resonant circuit.

DETAILED DESCRIPTION OF THE PREFERRED EMBODIMENTS

Electronic circuits according to embodiments of this disclosure will be described below with embodiments of an electronic pen of the electromagnetic induction system equipped with these electronic circuits with reference to the drawings.

First Embodiment

Figure 1:
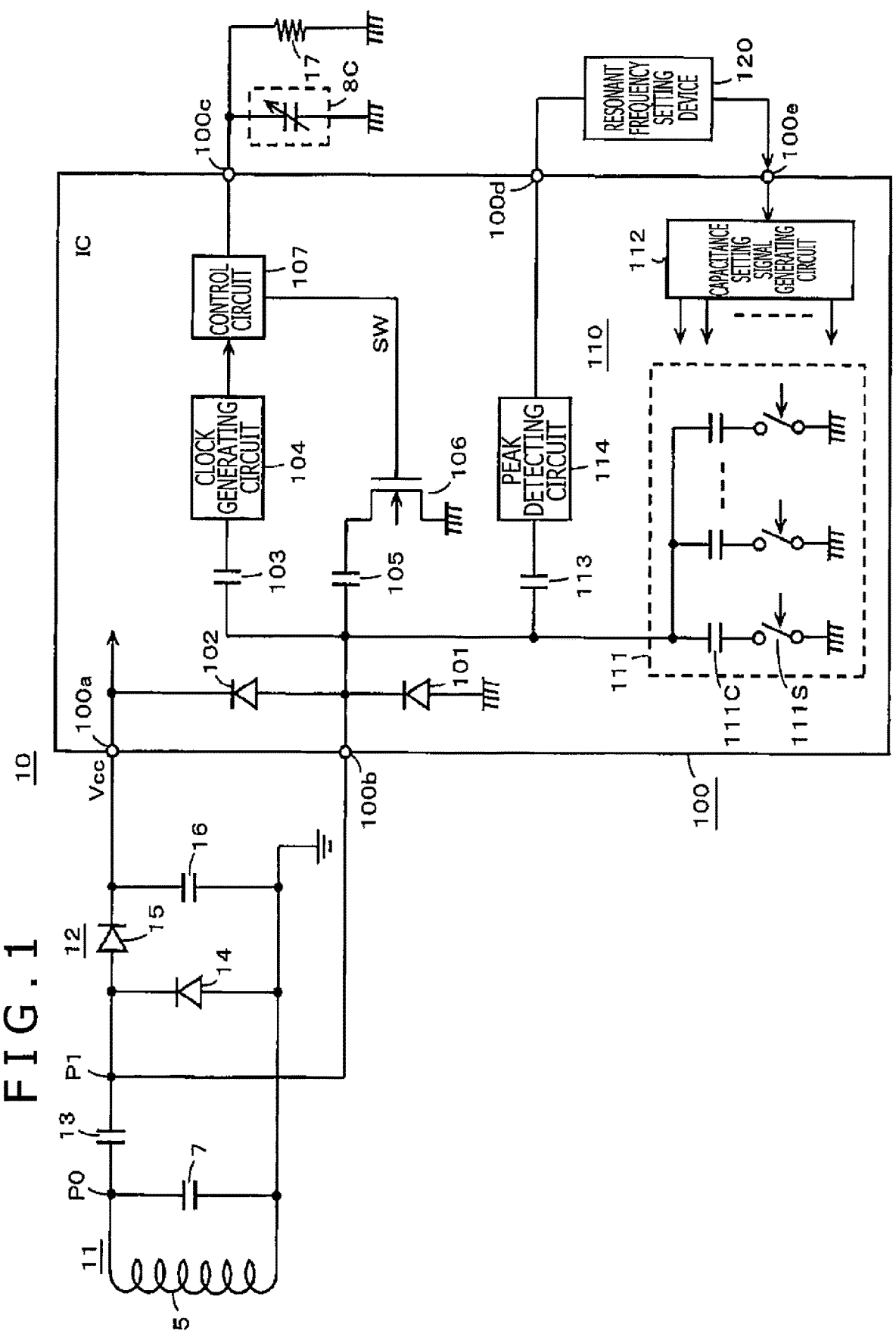
FIG. 1 is a diagram depicting a circuit configuration example of an electronic circuit of an electronic pen according to a first embodiment of this disclosure.
Figure 2:
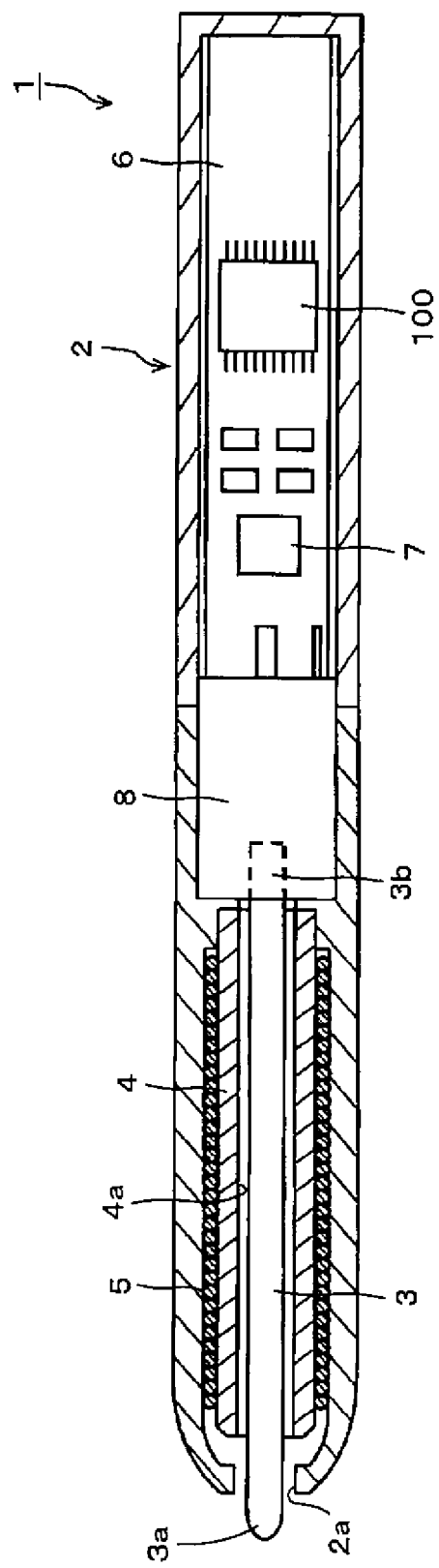
FIG. 2 is a longitudinal sectional view for explaining a configuration example of the electronic pen according to the first embodiment of this disclosure.

FIG. 1 is a circuit diagram for explaining a configuration example of the embodiment of an electronic circuit 10 when the electronic circuit 10 is applied to an electronic pen 1 of the embodiment. Furthermore, FIG. 2 is a longitudinal sectional view for explaining a hardware configuration example of the electronic pen 1 of the embodiment. First, the configuration example of the electronic pen 1 of FIG. 2 will be described.

As depicted in FIG. 2, this electronic pen 1 is configured to include, in a tubular housing (case) 2, a core body 3, a coil 5 wound around a ferrite core 4 with a circular column shape, a printed circuit board 6, a capacitor 7 and an IC 100 disposed on this printed circuit board 6, and a writing pressure detector 8.

The tubular housing 2 has an opening 2a on one end side in the axial direction and the other end side in the axial direction is closed. The printed circuit board 6 on which electronic components are mounted is fixed and disposed closer to the other end side in the axial direction in a cylindrical hollow part of this housing 2. Furthermore, the ferrite core 4 is housed closer to the one end side, on which the opening 2a of the housing 2 is formed.

As depicted in FIG. 2, the ferrite core 4 has a through-hole 4a in the axial center direction and the coil 5 forming a resonant circuit is wound and mounted around the outer circumference of the ferrite core 4. To both ends (not depicted) of the coil 5, the capacitor 7 disposed on the printed circuit board 6 is connected in parallel. Furthermore, the core body 3 is inserted in the through-hole 4a of the ferrite core 4.

The core body 3 is composed of a non-electrically-conductive material. One end of this core body 3 in the axial center direction is used as a tip part 3a having a role of a pen tip and protrudes from the opening 2a to be exposed to the outside when the core body 3 is inserted in the through-hole 4a of the ferrite core 4 and is housed in the housing 2. Furthermore, the other end 3b of the core body 3 in the axial center direction is joined to the writing pressure detector 8.

The writing pressure detector 8 is formed of a unit using a mechanism that changes the capacitance of a variable-capacitance capacitor according to the pressure (writing pressure) applied to the core body 3 (for example refer to a Patent Document (Japanese Patent Laid-open No. 2011-186803)). It is also possible to use, as the writing pressure detector 8, a unit in which the variable-capacitance capacitor is configured by a semiconductor chip formed of a micro electro mechanical systems (MEMS) element (for example refer to a Patent Document (Japanese Patent Laid-open No. 2013-161307)). The configuration of the writing pressure detector 8 is not limited to these configuration examples and may be a unit that detects the writing pressure as change in the inductance.

The electronic circuit 10 of this electronic pen 1 is configured as depicted in FIG. 1. Specifically, in this example, a resonant circuit 11 is formed by a parallel circuit of the coil 5 wound around the ferrite core 4 and the capacitor 7 disposed on the printed circuit board 6.

In this example, a rectification circuit 12 that rectifies an induced current flowing in the resonant circuit 11 due to electromagnetic induction from the external and generates a supply voltage Vcc of the IC 100 is disposed. The rectification circuit 12 includes capacitors 13 and 16 and diodes 14 and 15 and has a configuration of a rectification circuit of a half-wave voltage doubler type in this example.

On end side of the resonant circuit 11 is grounded and the other end side is connected to one end side of the capacitor 13. The other end side of the capacitor 13 is connected to a connecting node between the cathode of the diode 14 and the anode of the diode 15. The anode side of the diode 14 is grounded. Furthermore, the cathode of the diode 15 is grounded through the capacitor 16. A connecting node between this cathode of the diode 15 and the capacitor 16 serves as an output terminal of the rectification circuit 12 and the supply voltage Vcc is output. This output terminal of the rectification circuit 12 is connected to a connection pin 100a of the IC 100. Here, the supply voltage+Vcc is set to five volts in this example.

Furthermore, in the electronic circuit 10 of this embodiment, a connecting node P1 among the other end side of the capacitor 13, the cathode of the diode 14, and the anode of the diode 15 is connected to a connection pin 100b of the IC 100.

Figure 3A:
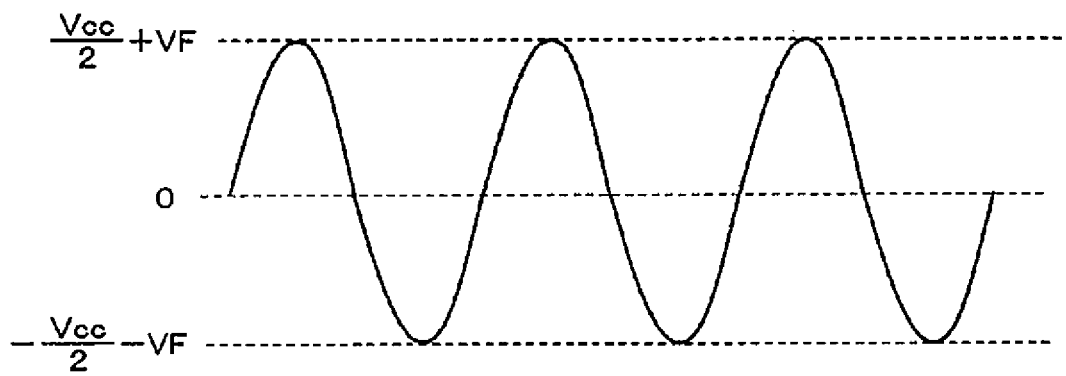
FIGS. 3A and 3B are diagrams for explaining the electronic circuit of the electronic pen according to the first embodiment of this disclosure.

An induced voltage is generated at a connecting node P0 between the one end side of the capacitor 13 and the resonant circuit 11 due to electromagnetic induction. The induced voltage obtained at this connecting node P0 is an AC voltage that vibrates in such a manner that the zero potential is the center and the positive-side peak value is Vcc/2+VF and the negative-side peak value is −(Vcc/2+VF) as depicted in FIG. 3A. VF is a voltage drop when the diode 14 is conductive.

If the connecting node P0 is connected to the IC 100, the negative-side peak value is −Vcc/2−VF as above. In the IC 100, if the negative-side voltage is lower than −VF volts, a diode 101 in the IC 100 becomes conductive and the voltage can not be taken in into the IC 100. For this reason, it is impossible to connect the connecting node P0 directly to the connection pin 100b of the IC 100 and use the IC 100.

Figure 3B:
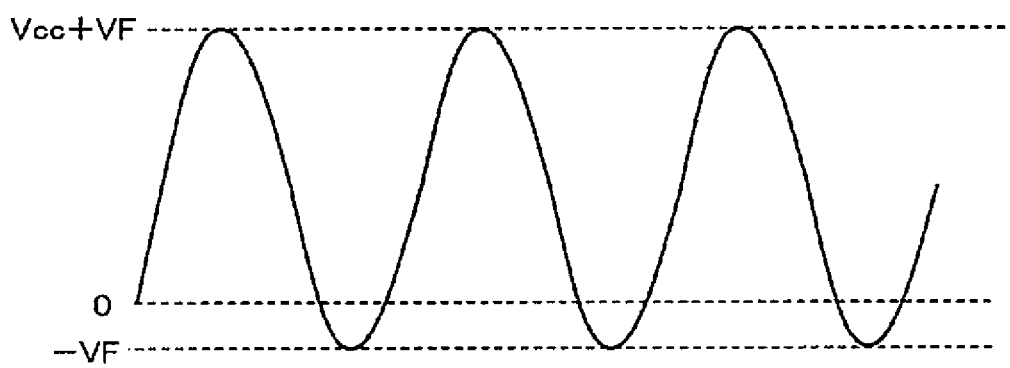

In contrast, at the connecting node P1 among the other end side of the capacitor 13, the cathode of the diode 14, and the anode of the diode 15, the induced voltage obtained in the resonant circuit 11 is clamped by the diode 14. Thus, the induced voltage becomes an AC voltage that vibrates in such a manner that the positive-side peak value is (Vcc+VF) volts and the negative-side peak value is −VF volts as depicted in FIG. 3B.

For this reason, when the connecting node P1 is connected to the connection pin 100b of the IC 100, the induced voltage falls within a range of Vcc+VF to −VF of the voltage that can be taken in by the IC 100 and the voltage can be taken in into the IC 100. That is, by connecting the connecting node P1 between the other end side of the capacitor 13 and the diode 14 to the connection pin 100b of the IC 100, the IC 100 is enabled to handle the induced voltage that arises in the resonant circuit 11 without trouble. Therefore, in this embodiment, an adjustment circuit of the resonant frequency of the resonant circuit 11 can be disposed in the IC 100.

Specifically, in the IC 100, an adjustment circuit 110 of the resonant frequency of the resonant circuit 11 is disposed for the connection pin 100b. In this example, as depicted in FIG. 1, this adjustment circuit 110 of the resonant frequency is configured to include a variable-capacitance circuit 111, a capacitance setting signal generating circuit 112, a capacitor 113 for direct current (DC) blocking, and a peak detecting circuit 114.

Figure 4:
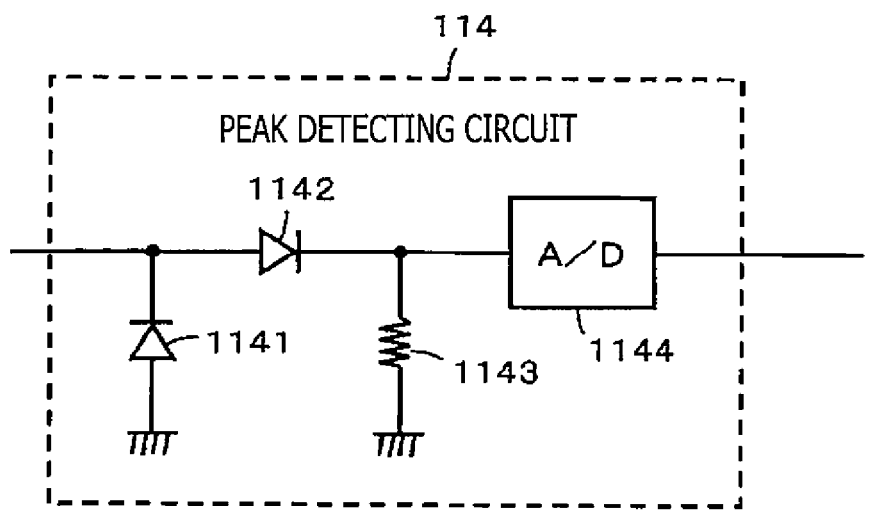
FIG. 4 is a diagram depicting a configuration example of part of the electronic circuit of the electronic pen according to the first embodiment of this disclosure.

As depicted in FIG. 4, the peak detecting circuit 114 has a circuit configuration including diodes 1141 and 1142 and a resistor 1143 and a peak detection output is converted to a digital signal by an analog-to-digital (A/D) conversion circuit 1144 and is output.

Furthermore, in this example, the adjustment circuit 110 of the resonant frequency disposed in the IC 100 is configured to cause the resonant frequency of the resonant circuit 11 to be optimized in the relationship with the position detecting sensor by cooperating with a resonant frequency setting device 120 disposed outside the IC 100. The resonant frequency setting device 120 may be formed of a dedicated device or may be formed of a general-purpose device such as a computer.

The variable-capacitance circuit 111 is configured by connecting plural series circuits of a capacitor 111C and a switch circuit 111S in parallel. The capacitance setting signal generating circuit 112 generates switching control signals to control the on- and off-states of each of the plural switch circuits 111S of this variable-capacitance circuit 111. The capacitance of the variable-capacitance circuit 111 is the combined capacitance of the parallel circuit of one or plural capacitors 111C connected in series to the switch circuits 111S turned on by the plural switching control signals from the capacitance setting signal generating circuit 112.

Furthermore, the induced voltage (see FIG. 3B) applied to the connection pin 100b is supplied to the peak detecting circuit 114 through the capacitor 113 and the peak value is detected. The detection output of this peak value detected by the peak detecting circuit 114 is supplied to the resonant frequency setting device 120 outside the IC 100 through a connection pin 100d.

When optimization processing of the resonant frequency of the resonant circuit 11 is performed, after the electronic pen 1 is set to the state of receiving an AC signal from the position detecting sensor, first the resonant frequency setting device 120 generates, to the capacitance setting signal generating circuit 112, a search control signal to search the plural switch circuits 111S of the variable-capacitance circuit 111 in such a manner that the variable-capacitance circuit 111 sequentially exhibits plural combined capacitances that can appear.

Then, the resonant frequency setting device 120 receives the detection output of the peak value of the peak detecting circuit 114 during the search through the connection pin 100d and detects the maximum peak value. After succeeding in detecting the maximum peak value, the resonant frequency setting device 120 stops the search control signal to the capacitance setting signal generating circuit 112.

Then, the resonant frequency setting device 120 supplies a control signal to instruct the capacitance setting signal generating circuit 112 to hold the control state of the plural switch circuits 111S of the variable-capacitance circuit 111 when the maximum peak value has been detected to the capacitance setting signal generating circuit 112 through a connection pin 100e. The capacitance setting signal generating circuit 112 receives this control signal and keeps the state in which the switching control signals when the maximum peak value has been detected are supplied to the plural switch circuits 111S of the variable-capacitance circuit 111. When this optimization processing ends, the connection between the resonant frequency setting device 120 and the connection pins 100d and 100e of the IC 100 is released.

Thereby, the resonant circuit 11 of the electronic pen 1 is controlled to have the optimum resonant frequency with respect to the position detecting sensor.

Figure 6:
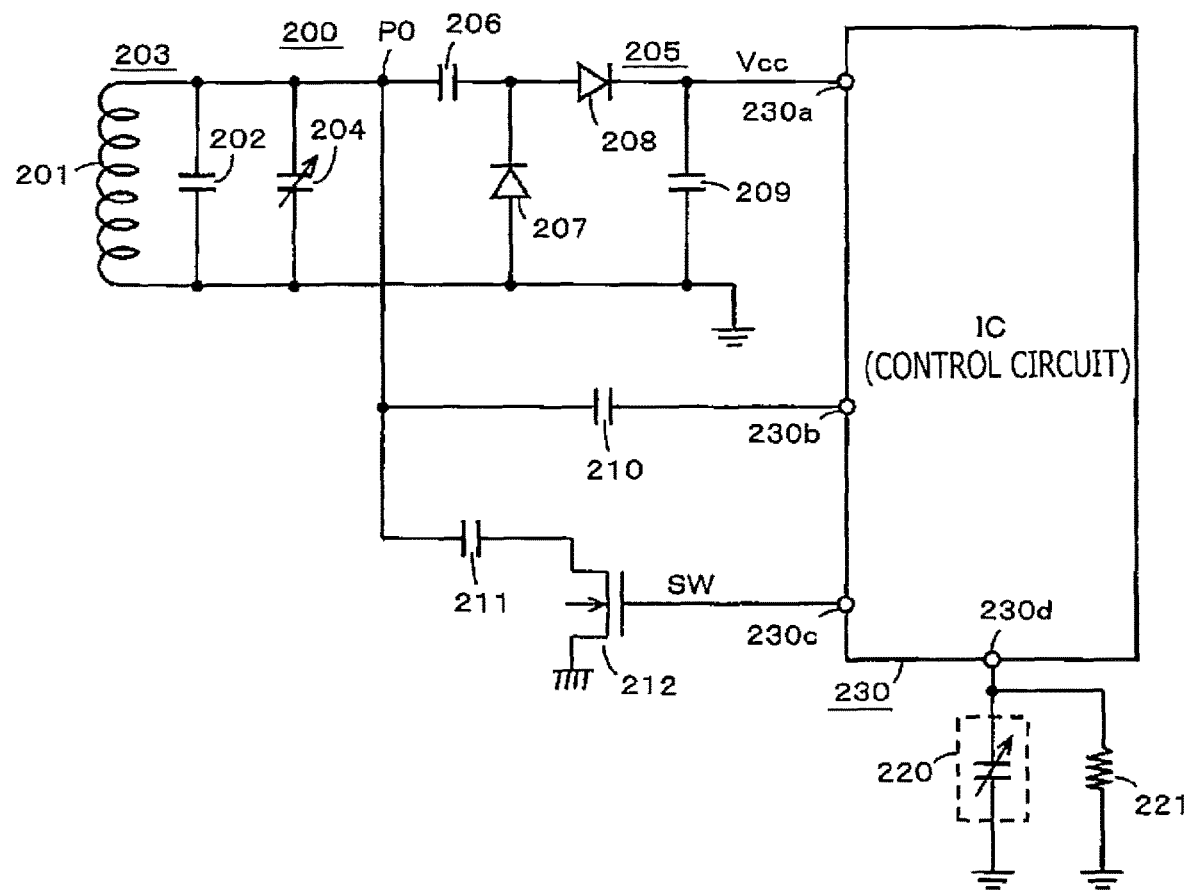
FIG. 6 is a diagram depicting a circuit example of an electronic circuit of an electronic pen of a related art.

Incidentally, similarly to the electronic circuit depicted in FIG. 6, the electronic circuit 10 of the electronic pen 1 of this embodiment also includes a circuit that generates a clock signal from the AC signal acquired from the position detecting sensor through electromagnetic induction and a modulation circuit for transmitting additional information such as writing pressure information to the position detecting sensor side.

In this case, as described above, in this first embodiment, the induced voltage from the position detecting sensor obtained in the resonant circuit 11 can be handled by the IC 100. Thus, the clock generating circuit and the modulation circuit are configured in the IC 100 and these circuits are configured to be connected to the connection pin 100b.

Specifically, in this embodiment, in the IC 100, the connection pin 100b is connected to an input terminal of a clock generating circuit 104 through a capacitor 103 for DC blocking. The clock generating circuit 104 generates the clock signal from the AC signal input through the connection pin 100b (induced voltage acquired in the resonant circuit 11) and supplies the clock signal to a control circuit 107.

Furthermore, the control circuit 107 is grounded through a variable-capacitance capacitor 8C formed of the writing pressure detector 8 externally connected to the IC 100 through the connection pin 100c. A resistor 17 is connected in parallel to the variable-capacitance capacitor 8C. Similarly to the description of the electronic circuit 200 in FIG. 6, the control circuit 107 detects the discharge time of the variable-capacitance capacitor 8C to detect the capacitance of this variable-capacitance capacitor 8C and generates digital information of a writing pressure value based on the detected capacitance.

Moreover, the connection pin 100b is grounded through a series circuit of a capacitor 105 and a switch circuit 106 in the IC 100. The switch circuit 106 is on- and off-controlled by a control signal SW from the control circuit 107 and modulation of changing the resonant frequency of the resonant circuit 11 or changing the phase thereof is carried out based on whether or not to connect the capacitor 105 in parallel to the resonant circuit 11 similarly to the description with FIG. 6. Thereby, the digital information of the writing pressure is sent out from the electronic pen 1 in an additional information period under control by the control signal from the control circuit 107 similarly to the description with FIG. 6.

In this example, the connection pin 100b is grounded through the diode 101 for protection and is connected to the connection pin 100a, at which the supply voltage Vcc is obtained, through a diode 102.

As described above, according to the electronic circuit 10 of the electronic pen 1 of the first embodiment, the trimmer capacitor for adjustment of the resonant frequency of the resonant circuit 11 is unnecessary and correspondingly cost reduction is achieved. Furthermore, the resonant frequency of the resonant circuit 11 can be automatically adjusted by the resonant frequency setting device 120. Therefore, adjustment work of the resonant frequency becomes easy compared with the case of adjusting the trimmer capacitor.

Furthermore, according to the above-described first embodiment, the capacitor for connecting to the clock generating circuit 104 in the IC 100 can also be disposed in the IC 100 while being connected to the connection pin 100b. Thus, the capacitor 210 depicted in FIG. 6 becomes unnecessary and the connection pin 230b also becomes unnecessary.

Moreover, the circuit for modulation for generating additional information can be disposed in the IC 100 while being connected to the connection pin 100b. Thus, the capacitor 211 and the switch circuit 212 depicted in FIG. 6 become unnecessary and the connection pin 230c also becomes unnecessary.

In the above-described example, the resonant frequency setting device 120 is externally connected to the IC 100. However, functions of this resonant frequency setting device 120 may be set in the IC 100 as a resonant frequency setting circuit and this resonant frequency setting circuit may be configured to allow control of activation and stop thereof from the external.

Second Embodiment

In the electronic circuit 10 of the electronic pen 1 of the above-described first embodiment, information on the writing pressure detected by the writing pressure detector 8 is transmitted to the position detecting device as digital information by modulating a signal of the resonant frequency of the resonant circuit 11. However, it is also known that information on the writing pressure detected by the writing pressure detector 8 is transmitted from the electronic pen to the position detecting device as frequency displacement or phase displacement of the resonant frequency signal of the resonant circuit 11. This disclosure can be applied also to this case. An electronic circuit of a second embodiment corresponds to the case of making a configuration as above.

Figure 5:
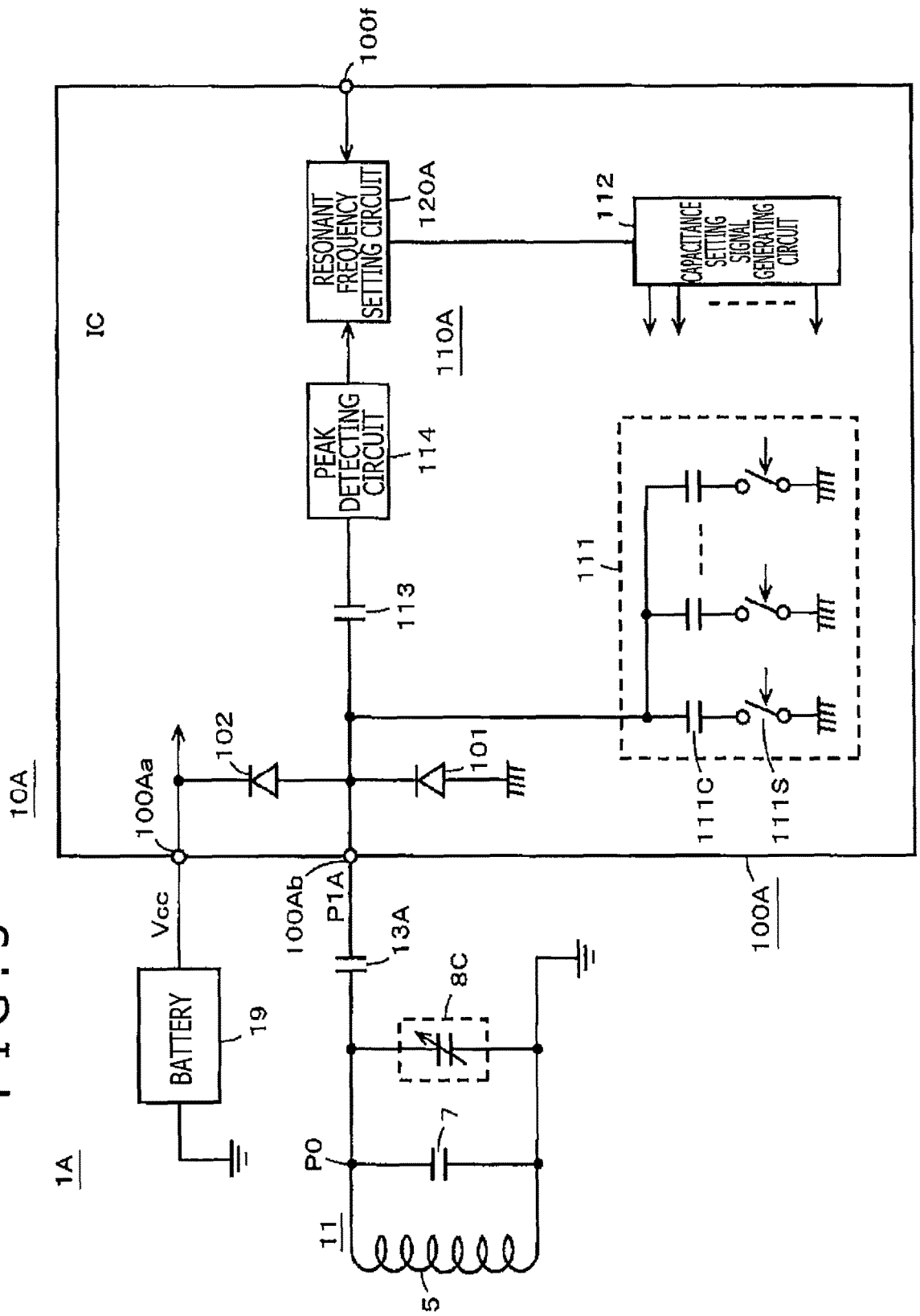
FIG. 5 is a diagram depicting a circuit configuration example of an electronic circuit of an electronic pen according to a second embodiment of this disclosure.

FIG. 5 is a diagram depicting a configuration example of an electronic circuit 10A of an electronic pen 1A of this second embodiment and the same constituent part as FIG. 1 is given the same reference symbol. An IC 100A of this second embodiment is different from the IC 100 of the first embodiment in its internal circuit configuration. In addition, the hardware configuration of the electronic pen is configured in exactly the same manner as the configuration depicted in FIG. 2 except for that the variable-capacitance capacitor 8C formed of the writing pressure detector 8 is connected in parallel to the resonant circuit 11 and is configured as part of the resonant circuit 11.

As depicted in FIG. 5, the variable-capacitance capacitor 8C formed of the writing pressure detector 8 is connected in parallel between one end of the resonant circuit 11 and the other end P0 thereof. In addition, the other end P0 of the resonant circuit 11 is connected to one end of a capacitor 13A. Furthermore, the other end P1A of the capacitor 13A is connected to a connection pin 100Ab of the IC 100A. Moreover, in this example, a battery 19 is disposed and the supply voltage Vcc is supplied from this battery 19 to a connection pin 100Aa of the IC 100A.

Furthermore, in the IC 100A of the electronic circuit 10A of this second embodiment, the connection pin 100Ab is grounded through the diode 101 and is connected to the connection pin 100Aa, to which the supply voltage Vcc is supplied, through the diode 102. In the electronic circuit 10A of this second embodiment, the diode 101 is essential. Due to the diode 101, also in this second embodiment, the induced voltage obtained on the side of the other end P1A of the capacitor 13A is clamped and is turned to a voltage like that depicted in FIG. 3B similarly to the above-described first embodiment.

Moreover, in this second embodiment, an adjustment circuit 110A of the resonant frequency is connected to the connection pin 100Ab of the IC 100A. However, different from the first embodiment, a clock generating circuit and a modulation circuit are not disposed in the IC 100A of the electronic circuit 10A of this second embodiment.

In this example, as depicted in FIG. 5, the adjustment circuit 110A of the resonant frequency in the IC 100A is configured to include the variable-capacitance circuit 111, the capacitance setting signal generating circuit 112, the capacitor 113 for DC blocking, the peak detecting circuit 114, and a resonant frequency setting circuit 120A. The resonant frequency setting circuit 120A is a circuit having the same functions as the resonant frequency setting device 120 externally connected to the IC 100 in the first embodiment. This resonant frequency setting circuit 120A is connected to a connection pin 100f of the IC 100A and is configured in such a manner that the resonant frequency setting circuit 120A receives activation control supplied from the external through this connection pin 100f and activation thereof is controlled.

In this embodiment, adjustment and setting of the resonant frequency of the resonant circuit 11 are carried out in the following manner. Specifically, in the state in which a writing pressure is not applied, the electronic pen 1A makes the state in which an AC signal from the position detecting sensor of the position detecting device is received, and supplies a control signal to activate the resonant frequency setting circuit 120A through the connection pin 100f of the IC 100A of the electronic circuit 10A.

Thereupon, the resonant frequency setting circuit 120A supplies a search control signal to the capacitance setting signal generating circuit 112 similarly to the resonant frequency setting device 120 in the case of the above-described first embodiment. After succeeding in detecting the maximum peak value, the resonant frequency setting device 120 stops the search control signal to the capacitance setting signal generating circuit 112.

Then, the resonant frequency setting circuit 120A supplies, to the capacitance setting signal generating circuit 112, a control signal to instruct the capacitance setting signal generating circuit 112 to hold the control state of the plural switch circuits 111S of the variable-capacitance circuit 111 when the maximum peak value has been detected. The capacitance setting signal generating circuit 112 receives this control signal and keeps the state in which switching control signals when the maximum peak value has been detected are supplied to the plural switch circuits 111S of the variable-capacitance circuit 111.

In this manner, also in the electronic circuit 10A of the electronic pen 1A of this second embodiment, the resonant frequency of the resonant circuit 11 can be optimally set by the IC 100A. In the case of this example, the resonant frequency setting circuit 120A is incorporated in the IC 100A. Thus, the external resonant frequency setting device 120 as in the first embodiment becomes unnecessary, which is convenient.

Also in the IC 100A of the electronic circuit 10A of this second embodiment, a configuration using the external resonant frequency setting device 120 may be employed as in the first embodiment.

Furthermore, although the battery 19 is disposed in this second embodiment, the supply voltage Vcc may be generated by rectifying the induced voltage generated in the resonant circuit 11 by the rectification circuit 12 similarly to the first embodiment.

Other Embodiments or Modification Examples

Although the cases of the electronic circuit of the electronic pen are described above, this disclosure can be applied to an electronic circuit that includes a resonant circuit and an IC and involves the need to adjust the resonant frequency of the resonant circuit.

Furthermore, as the method for optimizing the resonant frequency of the resonant circuit, the peak value of the induced voltage of the resonant circuit is detected and control is carried out to obtain the maximum peak value. However, it goes without saying that the optimization method is not limited to this method.

The resonant circuit of the electronic pen may be used only for receiving a signal from the position detecting sensor and signal transmission from the electronic pen to the position detecting sensor is not necessarily limited to the electromagnetic induction system using the resonant circuit. For example, this disclosure can be applied also to an electronic pen that receives magnetic field energy from the position detecting sensor by the resonant circuit to use this received magnetic field energy as a drive voltage of the electronic pen and as a trigger signal from the position detecting sensor and transmits a signal from the electronic pen to the position detecting sensor by an electric field.

It is to be noted that embodiments of the present disclosure is not limited to the foregoing embodiments, and that various changes can be made without departing from the spirit of the present disclosure.

What is claimed is:

1. An electronic circuit of an electronic pen, the electronic circuit comprising:
   an integrated circuit; and
   a resonant circuit that is formed of a parallel circuit of a coil and a first capacitor and is externally connected to the integrated circuit,
   wherein the integrated circuit includes a variable-capacitance circuit which, in operation, adjusts a frequency of the resonant circuit to an optimum resonant frequency that maximizes a peak value of an induced voltage of the resonant circuit, and has a connection pin connecting the variable-capacitance circuit to outside of the integrated circuit, wherein a first end of the parallel circuit is grounded and a second end of the parallel circuit is connected to a first end of a second capacitor externally connected to the integrated circuit, and wherein a second end of the second capacitor is connected to the connection pin of the integrated circuit and is connected to a diode which, in operation, clamps a potential of the second end of the second capacitor to a predetermined value.

2. The electronic circuit according to claim 1, wherein an anode of the diode is grounded and a cathode of the diode is connected to the second end of the second capacitor.

3. The electronic circuit according to claim 2, further comprising:

a circuit which, in operation, rectifies an induced current generated in the resonant circuit due to electromagnetic induction from the outside of the integrated circuit and generates a supply voltage for the integrated circuit, wherein the diode forms part of the circuit that generates the supply voltage for the integrated circuit.

4. The electronic circuit according to claim 1, wherein the diode is externally connected to the integrated circuit.

5. The electronic circuit according to claim 1, wherein the diode is incorporated in the integrated circuit.

6. The electronic circuit according to claim 1, wherein:

a clock circuit which, in operation, generates a clock from an electromagnetic induction signal that is received by the resonant circuit and is sent from a position detecting sensor, and a modulation circuit which, in operation, performs on- and off-control of the resonant circuit and modulates a signal to be returned to the position detecting sensor are incorporated in the integrated circuit, and the clock circuit and the modulation circuit are connected to the connection pin.

7. An electronic pen comprising:

an electronic circuit including:
an integrated circuit, and
a resonant circuit that is formed of a parallel circuit of a coil and a first capacitor and is externally connected to the integrated circuit, wherein the integrated circuit includes a variable-capacitance circuit which, in operation, adjusts a frequency of the resonant circuit to an optimum resonant frequency that maximizes a peak value of an induced voltage of the resonant circuit, and has a connection pin connecting the variable-capacitance circuit to outside of the integrated circuit, wherein a first end of the parallel circuit is grounded and a second end of the parallel circuit is connected to a first end of a second capacitor externally connected to the integrated circuit, and wherein a second end of the second capacitor is connected to the connection pin of the integrated circuit and is connected to a diode which, in operation, clamps a potential of the second end of the second capacitor to a predetermined value.

8. An electronic pen comprising:
a resonant circuit including a coil and a first capacitor;
a rectification circuit including a second capacitor having a first end that is connected to the resonant circuit; and
an integrated circuit that has a plurality of connection pins including a first connection pin connected to the rectification circuit and a second connection pin connected to a second end of the second capacitor, wherein the integrated circuit includes a variable-capacitance circuit which, in operation, adjusts a frequency of the resonant circuit to an optimum resonant frequency that maximizes a peak value of an induced voltage of the resonant circuit.

9. The electronic pen according to claim 8, wherein the rectification circuit includes a diode which, in operation, clamps a potential of the second end of the second capacitor to a predetermined value.

10. The electronic pen according to claim 9, wherein the diode and the second capacitor form a half-wave voltage doubler type of rectification circuit.

11. The electronic pen according to claim 8, wherein:
the integrated circuit includes a capacitance setting circuit which, in operation, causes the variable-capacitance circuit to exhibit a plurality of capacitances during a search,
the integrated circuit includes a peak detecting circuit which, in operation, detects a plurality of peak values of the induced voltage during the search, and
after the search, the capacitance setting circuit controls the variable-capacitance circuit to exhibit one of the capacitances exhibited during the search when the peak detecting circuit detected a maximum one of the peak values.

12. The electronic circuit according to claim 1, wherein:
the integrated circuit includes a capacitance setting circuit which, in operation, causes the variable-capacitance circuit to exhibit a plurality of capacitances during a search,
the integrated circuit includes a peak detecting circuit which, in operation, detects a plurality of peak values of the induced voltage during the search, and
after the search, the capacitance setting circuit controls the variable-capacitance circuit to exhibit one of the capacitances exhibited during the search when the peak detecting circuit detected a maximum one of the peak values.

13. The electronic pen according to claim 7, wherein:
the integrated circuit includes a capacitance setting circuit which, in operation, causes the variable-capacitance circuit to exhibit a plurality of capacitances during a search,
the integrated circuit includes a peak detecting circuit which, in operation, detects a plurality of peak values of the induced voltage during the search, and
after the search, the capacitance setting circuit controls the variable-capacitance circuit to exhibit one of the capacitances exhibited during the search when the peak detecting circuit detected a maximum one of the peak values.

* * * * *